Nov. 28, 1939.　　　　R. S. SANFORD　　　　2,181,743
CLUTCH OPERATING MECHANISM
Filed Aug. 18, 1933　　　2 Sheets—Sheet 1
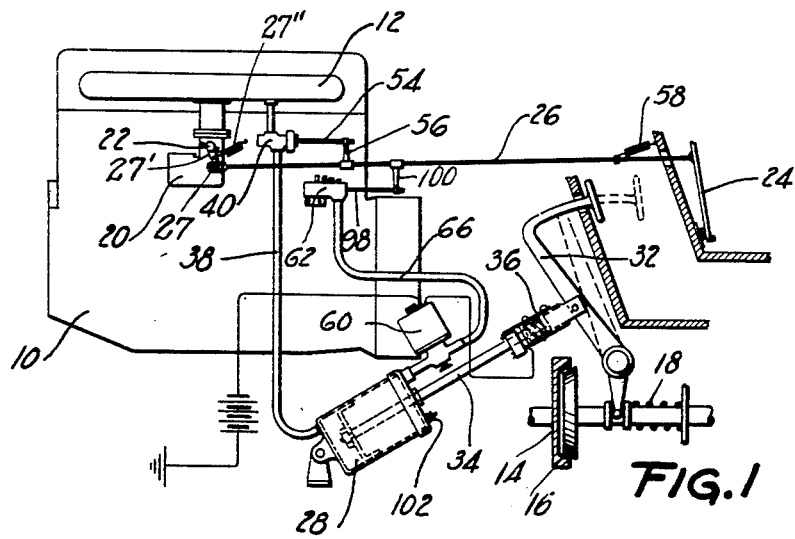
FIG.1
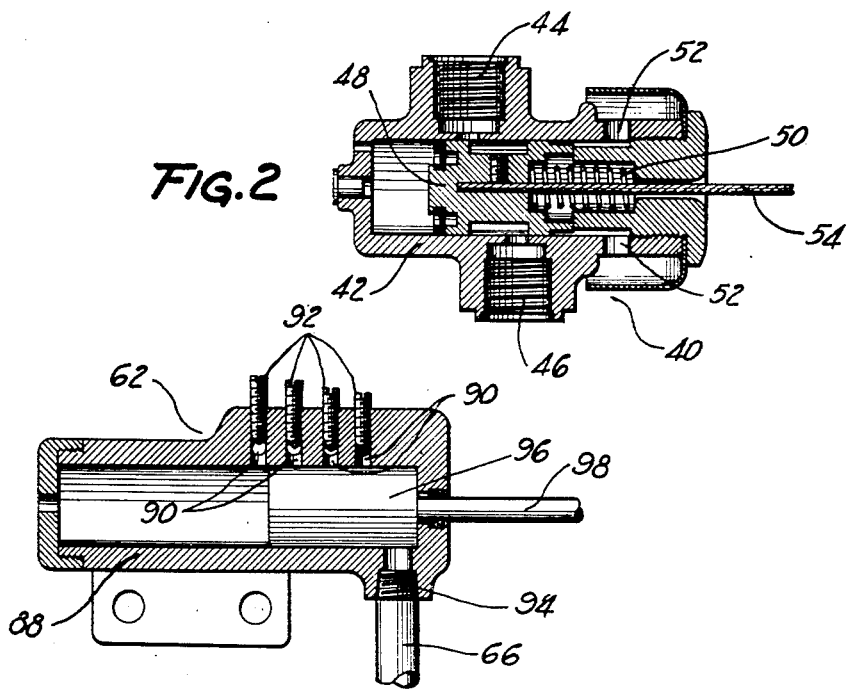
FIG.2
FIG.3
INVENTOR.
ROY S. SANFORD
BY H. O. Clayton
ATTORNEY Nov. 28, 1939.  R. S. SANFORD  2,181,743
CLUTCH OPERATING MECHANISM
Filed Aug. 18, 1933  2 Sheets-Sheet 2

INVENTOR.
ROY S. SANFORD
BY H. O. Clayton
ATTORNEY

Patented Nov. 28, 1939

2,181,743

UNITED STATES PATENT OFFICE 2,181,743

CLUTCH OPERATING MECHANISM

Roy S. Sanford, New York, N. Y., assignor to Bendix Aviation Corporation, South Bend, Ind., a corporation of Delaware Application August 18, 1933, Serial No. 685,719

11 Claims. (Cl. 192—.01)

This invention relates in general to mechanism for operating the clutch of an automotive vehicle, and more particularly to a vacuum operated power means controlled by the accelerator of the vehicle to successively effect a disengagement and an engagement of the clutch with release and depression of the accelerator respectively.

The invention is particularly concerned with automatically operable parts of said power means, said parts cooperating with manually operated parts of the power means to control the engagement of the clutch to accurately simulate the corresponding conventional manual operation of the clutch in effecting an engagement thereof.

More specifically, it is an object of the invention to provide means automatically operable, when the driving and driven clutch elements are pressed into engagement at a predetermined load, to effect a closing of a valve to terminate a relatively rapid engaging movement of the clutch. The completion of the engagement of the clutch is then effected by other valve means, preferably manually controlled to slowly move the elements of the clutch into driving engagement. By such an arrangement the total time required to engage the clutch is reduced to a minimum: furthermore, the degree of movement of the clutch during the aforementioned rapid stage of movement automatically increases with wear of the clutch, thus obviating adjustment of the mechanism throughout the life of the clutch facings.

A further object of the invention is to provide a relatively simple valve mechanism incorporated in the connection between the movable element of the clutch operating power actuator and the clutch, said valve comprising two relatively movable major parts, one part being connected to the movable element of the power actuator and the other to the clutch and operable by yielding means, such as a spring incorporated in series with the remaining parts of the connection.

Yet another object of the invention is to provide power means for operating a so-called first stage valve in a vacuum operated clutch actuator, said power means being controlled by a switch constituting a valve incorporated in the connection between the power element of the clutch actuator and the clutch, as above described.

To the above end there is provided a double-ended pressure differential operated motor, preferably of the vacuum type and operable by the manifold vacuum of the internal combustion engine of the vehicle, said motor being in part controlled by an accelerator operated three-way valve to initiate the operations of the motor in its clutch disengaging and engaging functions. The essence of the invention, however, resides in the provision of a spring operated valve or switch serving as a remote control means for a power operated quick relief or first-stage valve, the switch being preferably incorporated in series in the connection between the piston of the clutch motor and the clutch mechanism, said quick relief valve cooperating with other valve means, controlled by the accelerator, to determine the mode of operation of the driving clutch plate as the clutch is being engaged.

Restating the above, it is an object of the invention to provide a power operated clutch controlling mechanism, the complete clutch engaging operation of which is effected in a minimum of time, the mechanism insuring, however, a quick but nevertheless smooth start in traffic, a quick yet smooth engagement of the clutch after a free wheeling operation, and lastly insuring the effectiveness of the several operations of the clutch during the operation of the change-speed mechanism in stepping up the speed of the vehicle.

Further objects and novel features of the invention will appear more fully hereinafter from the following description, when taken in connection with the accompanying drawings wherein there is illustrated a certain preferred embodiment of the invention. It is to be expressly understood, however, that the drawings are for purposes of illustration only, and are not designed as a definition of the limitations of the invention, reference being had for this purpose to the appended claims.

In the drawings wherein similar reference characters refer to like parts throughout the several views, Figure 1 is a diagrammatic view of a portion of an automotive vehicle embodying the present invention;

Figure 2 is a sectional view of the accelerator operated three-way control valve for the clutch actuator;

Figure 3 is a sectional view of the manually operated bleed valve for controlling the slow or last stage of engaging movement of the clutch.

Figure 4:
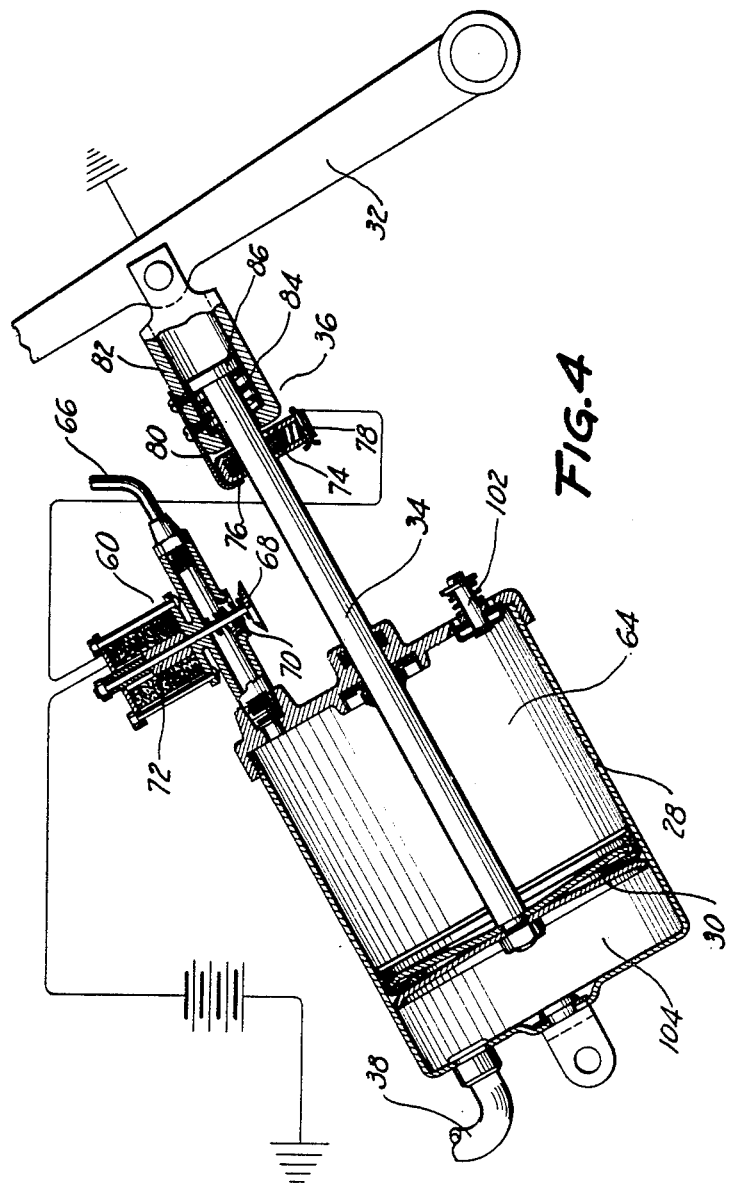
Figure 4 is a sectional view of the clutch actuator and its valve structure for controlling the rapid engaging movement of the clutch.

Referring more particularly to Figure 1 disclosing a preferred embodiment of the invention, there is shown a portion of an automotive vehicle comprising an internal-combustion engine 10 having a throttle controlled intake manifold 12, said engine being adapted to be drivably connected to a change-speed transmission and drive shaft, not shown, by means of a clutch comprising driving and driven friction elements 14 and 16 respectively, and a conventional clutch spring 18, said clutch being interposed between the engine and transmission, as will be understood by those skilled in the art. A carburetor 20 supplies the explosive mixture to the engine via the manifold 12, the degree of mixture being controlled by a throttle or butterfly valve 22 operable by an accelerator 24 interconnected with the butterfly valve by a link 26. A lost motion connection 27 is provided interconnecting the link 26 and a butterfly valve operating crank arm 27'. The valve 22 is urged to closed position by a spring 27''.

The invention has to do with vacuum operated power means for operating the clutch, it being the general purpose of the invention to as closely as possible simulate a conventional manual operation of the clutch.

To the above end there is provided a clutch actuator comprising a cylinder 28 housing a reciprocable piston 30, the latter being operably connected to a conventional clutch pedal 32 by a connection comprising a rod 34 and a valve switch mechanism 36. The cylinder is connected at one of its ends with the intake manifold by means of a fluid transmitting conduit 38, an accelerator operated three-way control valve 40 being interposed in the conduit to, in part, control the clutch disengaging and engaging operations of the clutch actuator. At closed throttle the manifold is evacuated by virtue of the pumping effect of the engine pistons, thereby providing a source of vacuum for energizing the clutch actuator to effect a disengagement of the clutch.

The valve 40 forms no part of the instant invention, being more fully disclosed and described in the United States application of Victor W. Kliesrath, Serial No. 568,081, filed October 10, 1931. This valve preferably comprises a casing 42, ported at 44 and 46 to receive the parts of the conduit 38, the casing housing a reciprocable piston 48. The piston is normally biased to the left by a spring 50 to cut off the connection between the manifold and actuator and vent the latter to atmosphere via port 46 and atmospheric ports 52 in the casing of the valve. The valve piston 48 is connected to the accelerator 24 by links 54, 56 and 26, and with release of the accelerator to close the throttle an accelerator return spring 58, stronger than valve spring 50, serves to compress the spring 50, as disclosed in Figure 2, cutting off the communication between the atmosphere and actuator and placing the latter in communication with the manifold via ports 44 and 46 to evacuate the actuator and disengage the clutch. Thus with release and actuation of the accelerator respectively the three-way valve 40 is alternately operated to initiate the disengaging and engaging operations of the clutch by successively energizing and deenergizing the clutch actuator.

The essence of the present invention, however, lies in the construction, arrangement and mode of operation of the valves for controlling the clutch engaging operation of the clutch actuator to simulate a corresponding manual control of the clutch. To this end there are provided valve mechanisms 60 and 62 for controlling the gaseous pressure within the compression end 64 of the actuator, or rather for controlling the rate of efflux of pressure fluid from the actuator as the clutch is being engaged. Valve mechanism 60, with which the invention is particularly concerned, provides a quick relief function and controls a first or rapid stage of movement of the clutch during its engagement, and valve mechanism 62, known as a bleed valve, controls a second and relatively slow stage of clutch engaging movement. Both the first and second-stage valve mechanisms 60 and 62 are interposed in a bleed conduit 66 extending from the compression end of the actuator. Valve 60, which may be described as a quick relief valve, includes a poppet member 68 biased to an open position by a spring 70 and closed by a solenoid 72, the latter being controlled by the valve switch 36 in the connection between the piston 30 and clutch pedal 32. The valve switch preferably comprises two major parts, namely: (1) a hollow cylindrical contact member 74 slidably mounted on the connecting rod 34 by means of insulating material 76 pressed into frictional contact with the rod 34 by a spring 78, and (2) an insulator clip 80 and a metallic sleeve 82, the latter being pivotally secured to the grounded clutch pedal 32. The valve switch is operated, as described hereinafter, by means of a compression spring 84 interposed between the sleeve 82 and a head 86 on the end of the rod 34; since the valve switch serves to control the flow of a power fluid, namely, electricity, to render operative the solenoid, the switch serves therefore as a valve means and is so defined in certain of the claims.

The second-stage bleed valve mechanism 62 preferably comprises a casing 88 provided with a plurality of ports 90, variable as to their cross sectional area by adjustable members 92, a port 94 in the casing receiving the conduit 66 and a reciprocable plunger member 96 housed within the casing and operable by linkage 98, 100 and 26 connected to the accelerator 24.

Describing now the complete operation of the clutch actuator, with release of the actuator the three-way valve 40 is operated to interconnect the manifold and actuator, as previously described, a check valve 102 permitting an influx of air into the right compartment 64 of the actuator when the left compartment 104 is evacuated. The actuator is thus energized to disengage the clutch, the parts assuming the positions disclosed in Figures 1 and 4.

When it is desired to engage the clutch to start the car, or after an operation of the transmission, or possibly after a free wheeling operation of the car, the accelerator is depressed, thereby venting the left compartment 104 of the actuator and initiating the clutch engaging operation of the actuator under the action of the conventional clutch springs 18, the latter now acting as a prime mover. The rate of engagement is determined by the rate of efflux of air from the right or compression compartment 64 of the actuator, and such rate is controlled by the mode of operation of the valve mechanisms 60 and 62. The poppet valve member 68 is held open by its spring 70 during the movement of the actuator piston 30 to the left to disengage the clutch, the cylinder 74, by virtue of its friction mounting, moving as a unit with the rod 34 until the insulator clip 80 is contacted, thus separating the current-carrying sleeve 82 and the cylinder 74, the two serving as contact members and together constituting a valve switch.

The above described operation is made possible by the presence of the spring 84, in series in the connection between the piston 30 and the clutch pedal, said spring being weaker than the clutch springs, thus collapsing prior to any movement of the clutch pedal. After the left compartment 104 of the actuator is vented to initiate the engagement of the clutch, the clutch springs 18 move the piston 30 to the right, acting as a prime mover, this movement being relatively rapid due to the relatively rapid efflux of air via the open valve 68. This rapid movement continues until the driving and driven clutch members are moved into engagement with a force sufficient to permit the spring 84 to expand, thereby moving the contact 74 into engagement with the contact 82, completing the electrical current through the solenoid and closing the valve 68. The engaging movement of the clutch is then retarded, the remainder of the movement being controlled by the rate of efflux of air via the manually controlled bleed valve 62. In starting the vehicle the accelerator is usually only slightly depressed; therefore, the plunger 96 of the bleed valve is moved to uncover only the first or possibly the first and second of the ports 90. Thus a relatively slow bleed of air from the actuator is effected and the clutch moves slowly into a slipping engagement, as is desired. During the operation of the transmission with the vehicle in motion the accelerator is usually depressed to a greater extent, which with the present mechanism will result in an exposure of a greater number of ports 90 and consequently a faster final engagement of the clutch. In any event, the mode of clutch engagement is a function of the mode of operation of the accelerator.

With the present construction, prior to the contacting of the clutch elements the engaging movement is relatively rapid; thus the total elapsed time in effecting the engagement of the clutch is reduced to a minimum. The suggested construction is particularly adapted to present day clutch equipment, inasmuch as the mechanism insures a rapid engaging movement of the clutch until the clutch elements contact with a given load, thus automatically compensating for wear of the clutch facings. The mechanism therefore becomes self-adjusting, requiring practically no attention throughout the life of the clutch facings.

The termination of the first or rapid stage of clutch engaging movement, or rather the closing operation of the first-stage valve mechanism 60, is a function of the loading of the clutch elements, and the relative strengths of the clutch springs 18 and valve spring 84 may therefore be so determined as to terminate the aforementioned rapid stage of movement at a predetermined loading of the plates. It will also be noted that the power controlling switch valve 36 includes two major working parts, one of said parts 74 being secured to the piston and the other of said parts 82 being secured to the clutch, and furthermore that said switch valve is, in part, operable by a yielding member constituting a force transmitting element in the connection between the piston of the actuator and the clutch.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle comprising a clutch having driving and driven members, a pressure differential operated power means having its movable power element operably connected to the clutch, means for controlling the pressure differential acting on said power element, said means comprising means automatically operable, when and if the driving and driven members of the clutch are pressure loaded to a predetermined degree to effect a variation of the fluid pressure of said power means to retard the operation of engaging the clutch, said automatically operable pressure differential control means comprising a switch member incorporated in the connection between the aforementioned power element and the clutch.

2. In an automotive vehicle provided with a clutch having driving and driven elements and a clutch actuator, said actuator having its movable element operably connected to the driven element of the clutch, and valve means for controlling the clutch engaging operation of said actuator, said valve means comprising a power operated quick relief valve, a valve switch for controlling the operation of said relief valve, said valve switch comprising means incorporated in the connection between the clutch and actuator and operable in accordance with the degree of contact pressure of the driving and driven elements of the clutch.

3. In an automotive vehicle provided with a clutch having driving and driven elements, a double-ended clutch actuator having its movable element operably connected to the driven element of the clutch, and valve means for controlling the clutch engaging operation of said actuator by controlling the mode of efflux of power fluid from said actuator, said valve means comprising a solenoid operated quick relief valve, a valve switch for controlling the operation of said relief valve, said valve switch comprising means incorporated in the connection between the clutch and actuator and operable in accordance with the degree of contact pressure of the driving and driven elements of the clutch.

4. In an automotive vehicle provided with a clutch having driving and driven friction elements, a clutch actuator having its movable power element operatively connected to the driven element of the clutch, valve means for controlling the clutch engaging operation of said actuator, said valve means comprising a solenoid, a quick relief valve operated by said solenoid, a valve switch for controlling the operation of the solenoid, said valve switch comprising one part connected to the driven element of the clutch and another part frictionally mounted on the connection interconnecting the clutch and actuator, and a spring, in series in said connection, operative to control the operation of said valve switch in accordance with the degree of contact pressure of the driving and driven friction elements of the clutch.

5. Power means for operating an automotive clutch including driving and driven elements, said power means comprising a cylinder, a piston slidable in the cylinder, a throttle controlling means, means connecting the piston with a spring returned clutch control member having an idle and a clutching cycle of movement, said member being connected to said driven clutch element, a pipe connecting the cylinder with an intake manifold, means interposed in the pipe and operated by the throttle control to release the clutch control member for quick movement during its idle cycle, means operative at a predetermined loading of said clutch elements for determining the extent of idle movement of the control member and other means to retard the movement of the clutch control member during its clutching cycle.

6. In an automotive vehicle provided with a clutch operating member, vacuum operated power means for controlling the operation of the clutch comprising a pressure differential operated actuator, a connection interconnecting the actuator and clutch operating member, manually controlled valve means for initiating the clutch disengaging and engaging operations of the actuator, and other valve means for controlling the clutch engaging operation of the actuator comprising a manually operable bleed valve member and a quick relief valve member, the latter comprising a valve switch including a first contact member frictionally and slidably mounted on the aforementioned connection, and a second contact member connected to the clutch operating member.

7. In an automotive vehicle provided with a clutch comprising driving and driven members, pressure differential operated power means for disengaging the clutch and controlling the engagement thereof, said power means comprising an actuator comprising a double-ended cylinder and a piston reciprocable therein, a connection interconnecting the piston with the driven clutch member, valve means for controlling the gaseous pressure within one end of the cylinder, and other valve means for controlling the gaseous pressure within the other end of the cylinder, and means for controlling the operation of said last mentioned valve means including means incorporated in the aforementioned connection.

8. In an automotive vehicle provided with a clutch comprising driving and driven members, pressure differential operated power means for disengaging the clutch and controlling the engagement thereof, said power means comprising an actuator comprising a double-ended cylinder and a piston reciprocable therein, a connection interconnecting the piston with the driven clutch member, valve means for controlling the gaseous pressure within one end of the cylinder, and other valve means for controlling the gaseous pressure within the other end of the cylinder, and means for controlling the operation of said last mentioned valve means comprising two relatively movable major parts, one of said parts secured to said piston and the other of said parts secured to the clutch.

9. In an automotive vehicle provided with a clutch having a driving member, a vacuum operated double-ended power actuator operably connected to said driven member by tension means, said means including means for controlling the operation of a quick relief valve, valve means for controlling the degree of vacuum within one end of said actuator, and other valve means, including a quick relief valve, for controlling the degree of gaseous pressure within the other end of said actuator to thereby control the mode of movement of said driven clutch member as the clutch is being engaged.

10. In an automotive vehicle provided with an internal-combustion engine, a clutch having driving and driven members, the driving member being drivably connected to said engine, a throttle for said engine, an accelerator for operating said throttle, a vacuum operated power actuator operably connected to said driving member, an accelerator operated control valve for said actuator, and other valve means, in part operated by said accelerator and cooperating with said aforementioned valve means, for controlling the engagement of the clutch, said last mentioned valve means comprising a quick relief valve operable to retard the engagement of the clutch when and if the clutch members are loaded to a predetermined degree.

11. In an automotive vehicle provided with a throttle controlled accelerator, and further provided with a clutch comprising driving and driven members, a double-ended fluid pressure operated power actuator, the power element of which is connected to the driven member of the clutch, valve means for controlling the gaseous pressure within one end of said motor, and a plurality of valves for controlling the gaseous pressure within the other end of the motor to determine the mode of movement of the driven member as the clutch is being engaged, said latter valves comprising one valve for effecting a relatively rapid first stage of movement to said driven member and operable to terminate said first stage when the driving and driven elements of the clutch are pressure loaded to a predetermined degree, and further comprising a second valve, operable by and in accordance with the position of the accelerator, for then effecting a relatively slow second stage of movement of the driven clutch member.

ROY S. SANFORD.